S. C. SALISBURY.
GAS-BURNER.

No. 187,418.  Patented Feb. 13, 1877.

Attest:
C. Clarence Poole
S. Singleton Stout

Inventor:
Silas C. Salisbury
By his atty
R. D. O. Smith

UNITED STATES PATENT OFFICE.

SILAS C. SALISBURY, OF NEW YORK, N. Y., ASSIGNOR OF ONE-HALF HIS RIGHT TO JOSEPH H. BROWN, OF PITTSBURG, PENNSYLVANIA.

IMPROVEMENT IN GAS-BURNERS.

Specification forming part of Letters Patent No. 187,418, dated February 13, 1877; application filed July 29, 1876

*To all whom it may concern:*

Be it known that I, SILAS C. SALISBURY, of the city, county, and State of New York, have invented a new and useful Improvement in Gas-Burners, of which the following is a full and exact description, having reference to the accompanying drawing, wherein—

Figure 1:
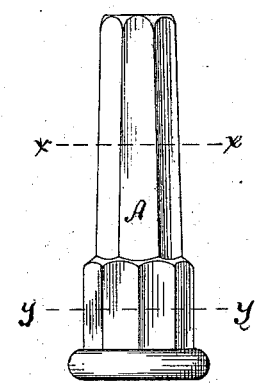
Figure 2:
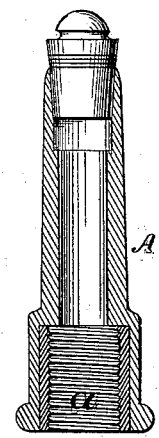
Figure 3:
Figure 4:
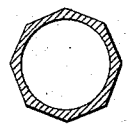

Figure 1 is an elevation. Fig. 2 is a sectional elevation of the same. Figs. 3 and 4 are transverse sections on lines $x\,x$ and $y\,y$, respectively.

This improvement relates to that class of burners which are made of glass, upon which the components of the gas can exert no chemical action, and they are therefore in the highest degree durable, which, together with the transparency and facility for brilliant coloring incident to the use of glass, renders these burners highly desirable.

My improvement consists in improved structure, whereby the construction is materially cheapened, and the process of application facilitated and the appearance improved.

That others may fully understand my improvement, I will particularly describe it.

A is the tubular body of my burner, made of glass molded to form. This burner-body is preferably about equal to the ordinary burner in dimensions, though it may be made of any size desired. At the upper end the central cavity is made tapering outward, for the purpose of receiving an ordinary lava tip, though it may be adapted to receive a tip of any other description. At the lower end of the tubular body A is an enlarged cavity to receive a screw-thimble or socket, $a$, which is preferably inserted in the mold, so that the glass is formed around and in contact therewith. By this proceeding said thimbles are more firmly set than in any other way, and the cost of manufacture is materially lessened. By placing the thimble inside of the cavity of the burner it is entirely hidden from sight, and the appearance is greatly improved.

I prefer to make the exterior surface with angular reflecting surfaces, which add greatly to the beauty and brilliancy of a chandelier. The glass may also be colored or ornamented, to suit the fancy.

The base is made octagonal, or otherwise angular, to afford a sufficient hold in screwing the burner upon the gas-pipe without the use of pliers.

I am aware that burners have been constructed of glass and iron, the glass portion being a section of glass tube inserted at each end in an iron collar; such burners are necessarily imperfect and expensive. I am also aware that burners have been made of porcelain, which is opaque and altogether inferior to glass in appearance and utility, and greatly more expensive. I am also aware that glass has been molded around metallic objects, so as to inclose and hold the same, and do not desire to claim any of these things broadly; but Having described my invention, what I claim as new is—

A gas-burner consisting of a glass body, A, with its top adapted to receive a burner-tip, and provided with a metallic screw-thimble, $a$, inserted within the base, substantially as set forth.

SILAS C. SALISBURY.

Witnesses:
R. D. O. SMITH,
C. CLARENCE POOLE.